United States Patent [19]
Robillard et al.

[11] Patent Number: 5,835,245
[45] Date of Patent: Nov. 10, 1998

[54] HOLOGRAPHIC METHOD AND MATERIALS TO DETECT AND PREVENT FORGERY IN IDENTITY CARDS

[75] Inventors: Jean J. Robillard; Eric Chesak, both of El Paso, Tex.

[73] Assignee: Board of Regents, The University of Texas System, Austin, Tex.

[21] Appl. No.: 299,369

[22] Filed: Sep. 1, 1994

[51] Int. Cl.⁶ .................................................. G03H 1/00
[52] U.S. Cl. .................................. 359/2; 283/86; 359/3
[58] Field of Search ............................. 359/2, 3; 283/86

[56] References Cited

U.S. PATENT DOCUMENTS

| | | | |
|---|---|---|---|
| 4,171,864 | 10/1979 | Jung et al. .................................. | 359/2 |
| 4,269,473 | 5/1981 | Flothmann et al. ........................ | 359/2 |
| 5,379,131 | 1/1995 | Yamazaki .................................... | 359/2 |
| 5,492,370 | 2/1996 | Chatwin et al. ............................. | 359/2 |

*Primary Examiner*—Jon W. Henry
*Assistant Examiner*—Darren E. Schuberg
*Attorney, Agent, or Firm*—Arnold, White & Durkee

[57] ABSTRACT

Security and identity cards including at least one hologram of the card, or part of the card, are disclosed. Holographic methods and materials to detect and prevent forgery in identity cards such as credit cards and access cards to security areas are disclosed. This invention employs microholograms that are recorded in very small areas on the card and that are not readily visible to the bearer. Special recording materials for high efficiency holograms are used to allow the confinement of the recording in an about 10 to about 100 micron size area. Apparatus for the recording and reading of the holograms are also disclosed.

15 Claims, 6 Drawing Sheets

HOLOGRAPHIC METHOD AND MATERIALS TO DETECT AND PREVENT FORGERY IN IDENTITY CARDS

BACKGROUND OF THE INVENTION

1. Field of the Invention

The present invention relates to the field of methods and materials for detecting and preventing forgery in identity cards and more particularly to detection methods that rely on the recording of microholograms using variable index materials on the surface of a card or card-like material for the purpose of identifying counterfeit cards. This may be accomplished by visualizing an original unaltered image of the card and comparing this image to a card being examined for authenticity, i.e., to detect alterations that have been made to a card.

2. Description of the Related Art

Holograms, in particular phase holograms, may be used for the recording and storage of security documents with high resolution. The ability for a material to record a hologram containing the maximum amount of information in a very small area with minimal loss of resolution is measured by the diffraction efficiency. The higher this value, the easier it will be to compress the information.

In order to select or develop a recording material with the highest possible diffraction efficiency, a sensitivity accessible to lasers in the mW range, and a reasonable time of exposure, the hologram will have to be a phase hologram in the category of "thick holograms". The photopolymers used for holographic recording show generally the same trends as silver halide emulsions. That is, high resolution materials have low speed and higher speeds are obtained with lower resolution.

The diffraction efficiency $\eta$ in volume phase transmission holograms (thickness >2 $\mu$m) can be expressed by:

$$\eta = \sin^2\left(\frac{\pi \Delta n d}{\lambda_a \cos\theta_o}\right)$$

where $\Delta n$: refractive index modulation d: thickness of the holographic emulsion $\lambda_a$: wavelength in air $\theta_o$: incident angle (typically 13°)

This expression is only valid for hologram reconstruction at Bragg angle. Thickness of a holographic emulsion may vary from 2 to 200 microns. Holographic recording materials which provided the highest $\Delta n$ as a response to light excitation would be the best candidates for high efficiency recording.

Some of the most promising variable index materials are organic semiconductors involving a donor-acceptor mechanism, for example, poly(N-vinylcarbazole) doped with the acceptor trinitro-2,4,7-fluorenone-9 (TNF). Conduction in an organic semiconductor depends on localized states in the conduction band of the material (Halperin, 1967; Gutmann and Lyons, 1967). These states may extend in the band gap as shown in FIG. 9. The lowest possible states are localized states but there is a critical energy $E_c$ for which the states are no longer localized. An electron may be promoted to a localized state in the conduction band thermally, by photoelectric effect or by injection. Once in that state it will be necessary to provide sufficient energy to displace the electron to another localized state. This energy can be thermal or photonic. The electron may also be transferred by tunnel effect if the orbitals overlap. The localized states of FIG. 9 correspond to traps for electrons generated photolytically in the material.

The trapped electron may oscillate under the influence of a periodic field. The system trap-electron becomes an elementary dipole contributing to the dielectric constant and the index of refraction of the material. This contribution is proportional to the maximum displacement of the electron during the oscillation, which corresponds to the depth of the traps $E_c$ and also the density of traps. The origin of the electrons may be a donor group of the polymer, for example, the hybrids orbitals of the metal atoms of a chelating group.

The change in index of refraction in an organic semiconductor may be evaluated from the electronic properties of the material (Robillard, 1990). Two cases may be considered depending on whether the change is produced by free carriers or by trapped carriers.

In the former case, the relative change is equal to:

$$\frac{1}{n} \Delta n \simeq \frac{e^2}{2v^2 e\pi m} \Delta N$$

where:

n: index of refraction e: permittivity

N: concentration of free electrons m: elementary mass of the electron c: elementary change of the electron v: frequency of the light.

In the latter case: the relative change is represented by:

$$\frac{1}{n} \Delta n \simeq 2\pi \alpha \cdot \Delta N$$

where:

N: density of the trapped carriers $\alpha$: electronic polarizability at optical frequency.

Some related art in the area can be summarized as follows.

The Konica patent (JP 4338593) relates to a recorded material to be used for identity cards. This material is described as being composed of a recorded image made by heat transfer on a substrate, such as paper, coated or synthetic paper, polyethylene terephthalate, a hologram layer, and a transparent protection layer. The hologram layer appears to be comprised of an electron beam curable resin. The transparent layer, which is comprised of a thermofusible compound and a thermoplastic resin, is preferably made on the hologram layer.

The Boehm et. al. patent (EP 486065) relates to embedding a hologram below the surface of paper. The hologram is apparently prepared on a carrier strip, typically made of plastic, and fed to the wet paper during manufacture.

Tobin (AU 8814140) reportedly relates to the use of discrete wavelength implantation in security holograms for use in security applications, such as identity, credit, debit, health cards and the like. This method involves the encoding of a two or three dimensional array of data in layers that can be stacked as laminates. Additional data can apparently be added by holographically encoding it using a different wavelength. The capacity for upgraded data lamination is described as being restricted by optical transmission efficiencies.

The Bingham et al. patent (U.S. Pat. No. 5,1699,707) relates to retroreflective security laminates. These laminates are described as being capable of being applied to the surface of a document over information, and as providing dual levels of verification. The laminates are described as having primary legends that are viewable under diffuse lighting retroreflective viewing conditions and as having retro-legends viewable only under retroreflective viewing conditions.

Neal et al. (U.S. Pat. No. 5,066,047) relates to a laminar structure that is apparently composed of a photograph and a supported hologram. The hologram is sufficiently adhered to the photograph that it is reportedly not possible to remove the photograph without fracturing the hologram and removing part of it.

Fujita et al. (U.S. Pat. No. 4,945,215) relates to an identity card that contains a hologram and an optical recording part. The optical recording technique is described as causing data pits to be formed on an optical reflective surface of the optical recording part. These data pits can be read by detecting the difference in optical reflectivity from the data pits when they are exposed to a laser beam.

The Haines patent (U.S. Pat. No. 4,832,445) relates to holograms that reconstruct an image that changes as the hologram is tilted.

The Hacking article (*BBC Engineering,* 1977) relates to the recording and retrieval of microholograms on photographic film. The long term goal of this study is the development of a system for recording digital television signals in real time using laser beam scanning and holographic techniques.

Yarmosh et al. (SU 647926) relates to the use of specially arranged microhologram matrices. These matrices can be apparently used in the design of multi-subscriber information systems.

Forgery in identity cards has been a growing problem because of the increased use of fake credit cards or identity cards to access restricted areas. It would be advantageous to confine holograms of an image of a card, such as a debit or security card or a license, to areas of the card that are not readily visible to the holder of the card. The reading of such microholograms by appropriate methods would immediately detect any attempt to modify the original aspect of the card. However, none of the above references disclose the use of microholograms on identity cards or the like, particularly as part of an anti-forgery and/or security system employing a hologram of the card itself.

SUMMARY OF THE INVENTION

The present disclosure addresses many of the problems inherent in the art by providing a new type of identity card in which microholograms of the image of the original card may be recorded in extremely small areas not readily visible to the holder of the card. These cards contain at least one small hole that is preferably filled with a holographic recording material capable of recording high efficiency holograms, preferably a high efficiency variable index material. The advantages of the use of microholograms on identity cards include the small size of the holograms and the relative ease with which copies of cards containing these small holograms can be detected without being visibly detectable through the viewing of the surface of the original card.

An embodiment of the present invention is an identity card (or other identity item or device), comprising a card and at least one hologram of the original card on at least one surface of the card. The identity card is preferably a plastic card. However, cards made of other materials, such as paper, cardboard, laminated materials, and the like are also encompassed by the present invention. The hologram is preferably a microhologram.

The term "original card" is used to refer to an authentic, or original, identity card. The original card, or more particularly the holographic image of the original card, is used to distinguish or detect alterations from an original card. Such will constitute an effective method for detecting a counterfeit card that a holder may present. An altered card would have at least one microhologram of the original card on it. Visual comparison of the image with an altered card presents a fast and simple technique for forgery detection. The identity card of the present invention may also be distinguished from fake, or forged, cards that may not have any microholograms on them.

The cards, and other items, that may be processed to include the described holograms as part of a system for controlling forgery, may be made of any material that is capable of retaining a variable index material, or other high efficiency recording material, in proper orientation such as to create a discernable holographic image thereon. Cardboard, plastics, metals and metal alloys may be employed in preparing the ID cards of the invention. These cards may be laminated, which would be particularly preferred in the use of the invention with cardboard and cardboard-like materials.

In a preferred aspect of the invention, organic semiconductors are employed as the variable index materials of choice. Organic semiconductors are the fastest variable index materials currently available, and have the added advantage of being reversible. Any variety of organic semiconductors known to those in the art may be employed in the practice of the present invention.

The holographically-marked cards or items of the present invention can include any number of holographic images of the card or item, or parts of the card or item, thereon. For maximal protection, a multiplicity of holographic images of the entire card or item being marked is preferred. Preferably 2 to 4 or 2 to 3, holographic images of the entire card or item, are used.

The holograms on the card are provided within holes on at least one surface of the card. The holes most preferably are of a depth of about 20 microns to about 100 microns and a diameter of from about 10 to about 100 microns. The microbiolograms of the card preferably have a thickness of from about 20 to about 100 microns, about 50 microns being preferred. The term "about" as used in the description of the present invention is defined as plus or minus 5 microns.

The holographic images may be arranged in virtually any design on at least one surface of the item/card. Most preferably, the holographic image should be emplaced on the item/card to minimize its ready visual detection to the unaided human eye. For example, a hologram of the sizes described in the present specification may be easily disguised within a design on a card. Designs that include images resembling an eye, such as within the eye of an eagle design on a card or other item, provides one particularly preferred embodiment of such a design that will provide such a camouflaging effect.

A process for preparing identity cards also constitutes an aspect of the present invention. At least one hole on the surface of the identity card is filled with a high efficiency holographic recording material. The holes on the card preferably have a diameter of from about 10 to about 100 microns (preferably 40 to about 60 microns), a diameter of from about 40 to about 100 microns, and a depth of from about 500 microns to about 1,000 microns, and are filled with a high efficiency variable index material. The filled holes are then exposed to a hologram of the card so as to record a hologram of the original card thereon by using a holocamera. The holocamera is comprised of a multiplicity of laser beams and a means for addressing a multiplicity of photosensitive elements to a multiplicity of reference beans. The holographic recording material has a thickness of from about 20 to about 100 microns. The preferred size of the resulting hologram provided in the process is between about 10 microns and about 100 microns in diameter.

In preferred aspects of the process, the hole is exposed to the hologram of the card by transmission. Preferably, the variable index material is an organic semiconductor.

As used herein the term "multiplicity" is used to refer to more than one. The preferred number of holes or holes filed with the variable index material ranges from about 2 to about 10, with the number of preferred holes being between 2–4 (or 2–3).

As used herein the term "holographic recording material" is used to refer to materials that are capable of recording and later reconstructing a pattern of interference between coherent light reflected from the object of interest and light that comes directly from the same source or is reflected by a mirror. The holographic recording material may generally be deposited on the identity card to have a thickness of from about 20 to about 100 microns. These materials are variable index materials. Photopolymerizable, photocrosslinking, photodegradable and photoismerizable compositions are most preferred embodiments of the variable index materials. Again, organic semiconductors are the most preferred variable index materials to be used.

The index variation in holographic recording materials may be due to different physical changes occurring in the recording materials, which may be classified as photopolymerizable, photocrosslinking, photodegradation, or photopolymerizable materials.

Photopolymerizable recording materials, the first named category of materials listed above, include a large number of materials that are commercially available. The most popular of these materials are the acrylic resins with the monomer dispersed in polymers such as polyvinylalcohol or polyvinylacetate and sensitized with methylene blue for a helium/ neon laser. Materials that are vinyl monomers that are activated by triethylamine or trialkylbenzylstannane, are also within the scope of the present invention.

Photopolymerizable compositions are materials that will polymerize when exposed to light. By way of example and not limitation, these materials include free radical ethylene monomer, 2,5-thienylenevinylene, 2,5-methoxy-p-phenylenevinylene, a vinyl monomer actuated by trialkylbenzylstannane, vinylnaphthalene, styrene, vinyl-2-fluorene and the like. For the case of the free radical ethylene monomer, its polymerization is preferably initiated by a combination of polyethyleneimine and lithium acrylate, although other initiation routes can also be employed.

The second category of materials (photocrosslinking) is best illustrated by the polyvinylcinnamates used as photoresist in the semiconductor industry. Here again, a variety of formulations have been used for holographic recording, but the efficiencies obtained do not exceed 65% and the sensitivity is one order of magnitude lower than what is needed for the recording of security cards.

Higher sensitivity and index variations of photocrosslinking materials can be obtained with copolymers with aromatic groups containing a high density of $\pi$ electrons. Such molecules include polyvinylnaphthalene with alternation of polystyrene and polyvinylnaphthalene (see FIG. 2A) or polystyrene and polyvinyl-2-fluorene (FIG. 2B) (Goutiere et al., Bull. Soc. Chim. 6, 153 (1964)).

The polychloride of vinyl-3-polydiphenyl-3-propene 1 (FIG. 3A) and vinyl-polyvinyl-fluorene [5] (FIG. 3B) are other promising candidates for high variable index materials.

Photodegradable compositions are materials that may degrade in the presence of light, such as polymethyl methacrylate. A representative list of useful photodegradable materials are provided in Example 4.

Holes on the surface of a card may be formed by use of a laser-pulse, by a drill, or a spark from a needle, or any other process that creates a hole or holes of the desired size. Pour-molding techniques may also be used. The holes preferably have a diameter of from about 20 and to about 100 microns, and a depth of from about 500 to about 1000 microns. These holes, once filed with a variable index material, may be exposed to the hologram of the card by transmission or reflection.

Two recording methods may be employed, transmission and reflection. In the transmission mode (see FIG. 5), the reference beam and object beam(s) are on the same side of the recording material. This causes the Bragg planes to be approximately normal to the plane of the film. In playback, the hologram modulates the phase and amplitude of the beam transmitted. A reflection type hologram would have the reference beam and the object beam on opposing sides of the film plane, as shown in FIG. 6, with the Bragg planes nearly parallel to the recording plane. Playback in this type of hologram causes the reflected phase and amplitude to be modulated.

The present invention also provides a means to insert a high efficiency holographic recording material into small holes of a few microns in size in a card.

Preferably, the microholograms will be of an identity and made in accordance with the present invention created at a location within a pattern or drawing on the card/item that minimizes the visibility of the microholograms on the card to the unaided eye. An example of such placement would be within the eye of an eagle design on the surface of a card. Therefore, in preferred embodiments, the identity care will also include a design into which a nmicrohologram may be incorporated inconspicuously.

The present invention includes the use of instruments for recording microholograms of the image of the card, or other item, in specific areas over the surface of a card, as well as instruments that provide for the reconstruction of microholograms inserted on the card. These may be accomplished using a holocamera which is comprised of a multiplicity of laser beams and a means for addressing a multiplicity of photosensitive elements to a multiplicity of reference beams. A preferred embodiment is modulating the multiplicity of laser beams by reflection on an identity card.

The present invention also encompasses a playback system for the visualization of microholograms recorded on identity cards. In a preferred embodiment, the playback system is comprised of a multiplicity of laser beams and a means for diffracting by microholograms to provide an image of said microhologram. The recorded hologram may be played back either by transmission or reflection to a CCD (charge-coupled device) array coupled to a video processor or some similar type of video system.

A further embodiment of this invention is a process of detecting altered or forged identity cards by visualizing the microhologram of an identity card of the present invention and comparing the visualized image of the microhologram to the actual card (i.e., the card that is being presented). Any differences between the visualized holographic image and the card presented indicates an altered identity card. Forged identity cards may also be detectable by the complete absence of a microhologram of the card being presented.

Another aspect of the present invention is a security system for regulating the use of identity cards. This system is comprised of a card, such as a card of the present invention that includes a holographic image of the card thereon, a playback system, and a means for comparing the visualized microhologram on the card with the card presented. This means for comparing may comprise a person, computer, or other automated system that is capable of discerning an alteration between a holographic image of an original card/item and a potentially forged or illegitimate card/item. Identity cards, such as social security cards, drivers licenses, employee access cards, and the like, as well as credit cards, telephone and bank credit cards in particular, may be prepared in accordance with the present invention.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

Figure 1A:
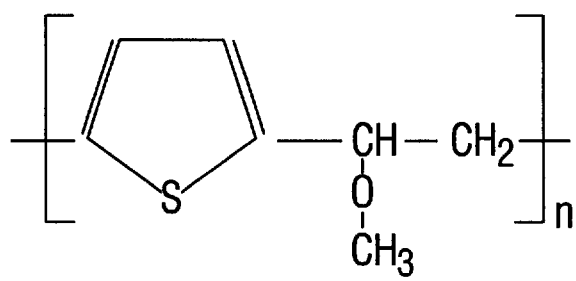
FIG. 1A. The polymer of 2,5-thienylenevinylene.

Number designations for FIGS. 5, 6, 7 and 8:
1. Mirror
2. Bean splitter
3. Pulsed ruby or similar laser
4. HOE
5. Lens
6. Scattered light
7. Recording material
8. Object to be recorded
9. Playback screen or other detector
10. Diode laser FIG. 9. Energy diagram of an organic semiconductor.

DETAILED DESCRIPTION OF PREFERRED EMBODIMENTS

This invention relates to materials and methods useful in the recording and reading of microholograms on identity cards. The particular technology involves the development and use of high efficiency holographic recording materials that are able to record a hologram of the original card, or other identity or access device, in a very small area with minimal loss of resolution.

It is also an objective of the present invention to insert the holographic material in small holes, or well indentions, of a few microns in size and record microholograms of the image of the card in such specific area of the surface of the card. This is accomplished by filling small holes, or crevices, between 10 and 100 microns in diameter, with holographic recording materials, and then recording a hologram in the filled holes by either reflection or transmission.

The invention also encompasses a recording system for making the microholograms. The holographic recording materials of this system are variable index materials which include photopolymerizable, photocrosslinkable, photodegradable and photoisomerizable materials.

Some exemplary holographic recording materials usable in the invention are described in the specific examples. The holocamera used in conjunction with this particular system employs a multiplicity of laser beams that will be modulated by reflection on the identity cards and can address a multiplicity of photosensitive elements on the card to a multiplicity of reference beams.

Figure 5:
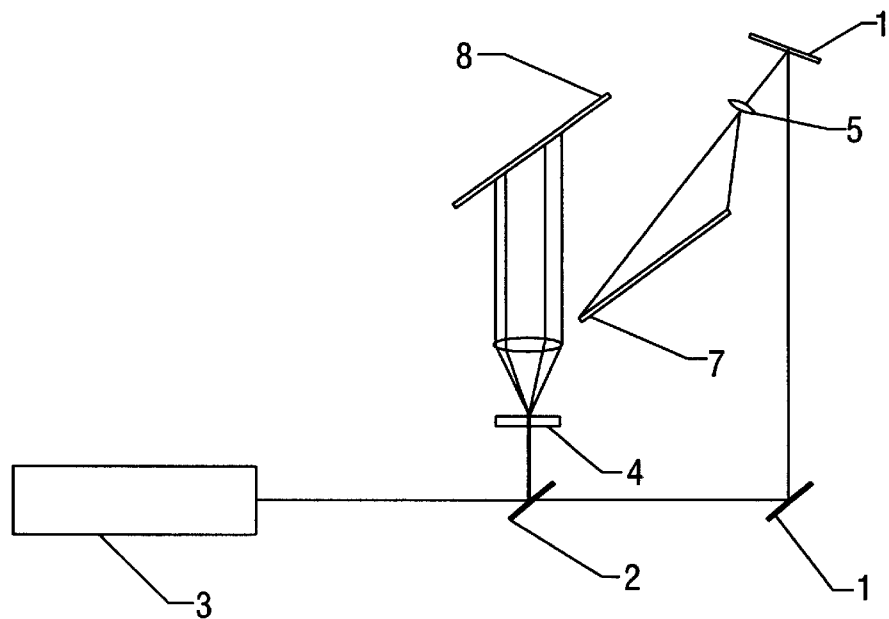
FIG. 5. Transmission mode recording system.
Figure 6:
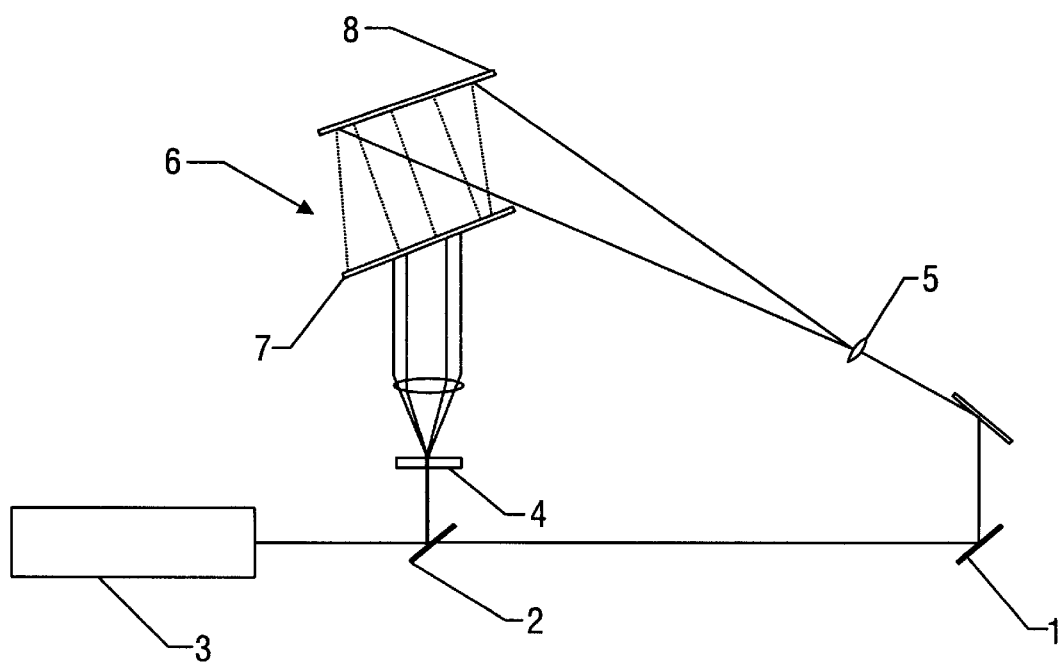
FIG. 6. Reflecting mode recording system.

The recording of the microholograms may be accomplished with a holocamera, as represented in FIG. 5 for transmission mode or FIG. 6 for reflection mode. The use of a pulsed ruby laser would be preferable for purposes of stability. This laser may allow flexibility in the design of the optical system as well as the card mounting or holding device. This laser, when Q-switched may have very short but high power optical pulses. These pulses are usually 10 to 20 nanoseconds wide with peak powers in the 10's or 100's of megawatts.

Holographic exposures require a system of extreme stability. In the holographic recording process the primary beam is split into two mutually coherent beams. One beam is directed toward the object to be recorded and the other beam is used as reference in the plane of the film. The modulated light of the beam reflected by or transmitted through the object interferes with the reference beam. However, once the primary laser beam is separated into its two recording components, reference and object beams, movement of fractions of a wavelength will degrade or destroy the recorded holographic pattern. This stability requirement is not required for optical pulses in the nanosecond time frame. In this fraction of time, the optical system, for all practical purposes, is stationary or movements that occur are insignificant to the recording process. Using a pulsed laser such as a Ruby laser will aid in rapid recording of the identification cards.

Another primary advantage of using a Ruby laser for recording is the wavelength. The ruby laser has a spectral emission at 694 nm. This relatively long wavelength will aid in playback with some types of semiconductor or a helium neon (HeNe) laser. The use of a semiconductor laser as the playback source would allow for a very compact unit. These types of lasers are readily available in the 670 to 700 nm region. Although the recording system would operate relatively well with a blue laser, argon for example, there are currently not semiconductor lasers on the market that lase in the same region. It would require the use of a green HeNe or some type of frequency doubled YAG (Yttrium aluminum garnet) laser as the playback laser.

A playback system that allows for the visualization of the microholograms by diffracting a multiplicity of laser beams by the previously described microholograms to provide the original image of the identity card constitutes another aspect of the present invention.

Figure 7:
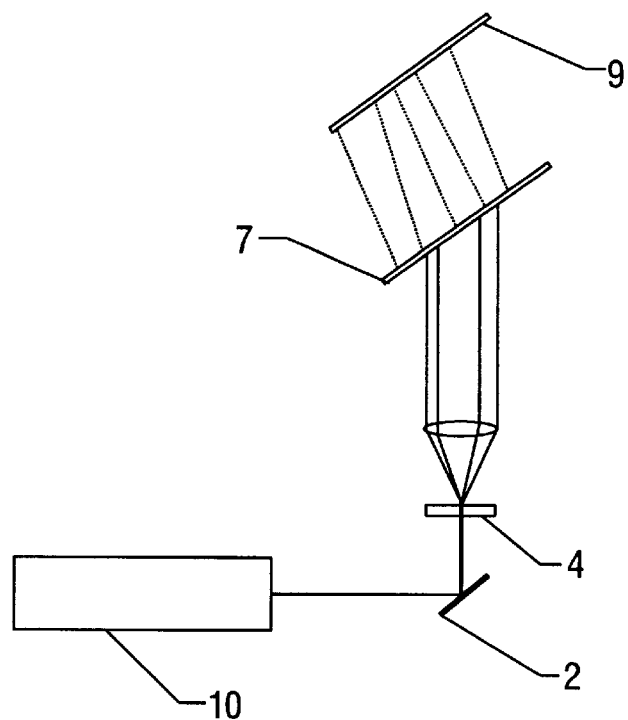
FIG. 7. Transmission mode playback system.
Figure 8:
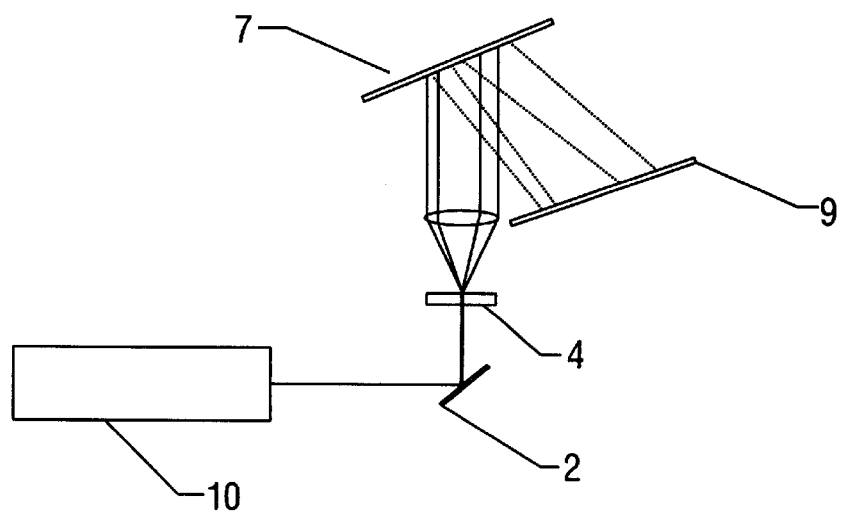
FIG. 8. Reflection mode playback system. Image may be played back either using the HOE to illuminate all the spots or one spot may be played back by aiming the Diode Laser along one of the diffracted spots.
Figure 9:
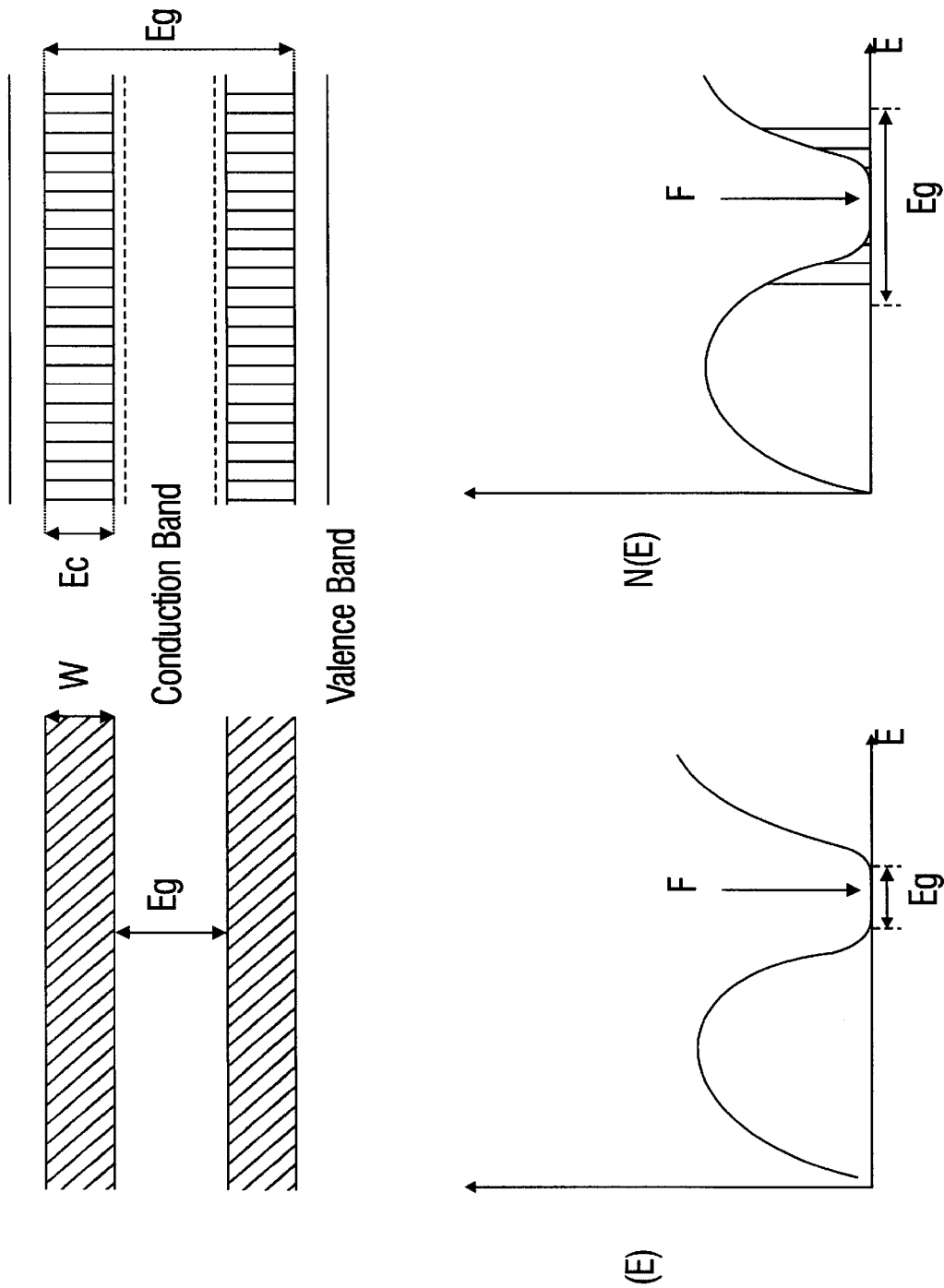

The visualization or playback of the original image of the card, according to the invention, is best described in FIGS. 7 and 8 representing a system containing all the optics necessary for the reconstruction of the holograms recorded in the small holes of the matching optics, imaging optics, and all the optics necessary for directing the laser diode beam.

The video output is processed by an image processing equipment and an image of the original security card is displayed on a liquid crystal panel. The system is mounted in a small desk top unit which may be easily located in any office where the control of the cards is to be performed.

Since illuminating the hologram with the original beam may playback the holographic virtual image, the card may be rotated to be illuminated with the conjugate beam, with respect to the hologram. Illumination under these conditions may playback a real image of the recorded object. The real object may be needed to replay so conditions exist that the image may be detected. This would require that the holographic spots be placed in some symmetric manner so the beams illuminate the holographic spots in both modes.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described.

The following examples are provided for purposes of clarification not limitation. One skilled in the art would recognize in light of the present disclosure that although the specified materials and conditions are important in practicing the invention, unspecified materials and conditions are not excluded as long as they do not prevent the benefits of the invention from being realized.

RECORDING MATERIALS

The recording materials used for these procedures can be ANY material that can record holographic images with high efficiency. The only limitation on the materials used in the recording process is the resolution and thus the final microhologram size. Materials to be used may include photopolymers like the Dupont HRF series as well as the HRS series or the Polaroid DMP class of photopolymers. Also in this class are the dichromated gelatins, primarily used in display holography and military Heads-Up Displays (HUD's). Both of these classes of materials have very high resolving limits due to their molecular form.

RECORDING PROCESS

The process to record the holograms used in the present invention is very similar in some respects to standard holographic arrangements. The primary laser beam is directed from the laser to the first element of the optical arrangement. This is usually some type of beam splitter. The two beams are directed as follows: The first beam (OBJECT beam), is directed to the image to be recorded. There are several methods to carry this out. One method is to illuminate the object, in this case, the ID card to be recorded. The reflected light is then scattered toward the recording material. The image of the object can then be focused onto a spot or not, depending on hologram size, an image will result either way. Another method is to make some type of transparency of the identity card, either by means of photography or xerography. The object beam is then up-collimated, passed through the transparency then down-collimated . The object beam now carries the holographic information. This beam is then directed to the recording material where it may be focused to a spot size of required dimensions.

The other beam (REFERENCE beam), directed from the beam splitter, is relayed to the recording material directly and focused at the point on the same side of the material as the object beam. The beam is used as a reference for the object beam. This beam is directed in the same manner for either of the above cases.

One key element in the optical system is the replay scheme. However the hologram is recorded, with respect to focal length, angle of recording, etc., the exact conditions, at the time of recording, must be met in order to replay the image in its highest quality. This is not only the case for the identity card holograms, but is true for any type of holographic recording, and is well understood by those in the field.

EXAMPLES

Example 1

Free Radical Ethylene Material, Preparation
Reparation of Hologram Recording Material The present example describes a novel variable index material made for creating high resolution small holograms in the size range of about 10 microns.

The polymerization of the free radical ethylene unsaturated monomer was initiated by a combination of a polyethyleneimine and lithium acrylate. A typical composition was:

Acrylic acid 1.09 g (a monomer)
Lithium acrylate 13.52 g (a monomer)
Polyvinylpyrrolidone 6.08 g (binder)
Methylene blue 0.04 g (sensitizer)
N-N'methylenebisacrylamide 0.1 g (a monomer)
p-methoxyphenol 0.003 g (electron donor-activator)
Isopropanol 1.01 g (solvent)
Surfactant 0.04 g
Polyethyleneimine 3.66 g (binder)

Example 2

Semiconductor Polymers with Electron Donating Groups, Preparation of Hologram Recording Material Semiconductor polymers having electron donating groups that contribute to the change in refraction index are described in this experiment. Such polymers were obtained by introducing thiophene or aromatic groups in a linear conjugated structure as indicated on FIGS. 1A–B [1].

The sensitive layer employed in the preparation of the presently described microholograms was prepared from a 2% solution of the monomer 2,5-thienylenevinylene (FIG. 1A) in chloroform.

Figure 1B:
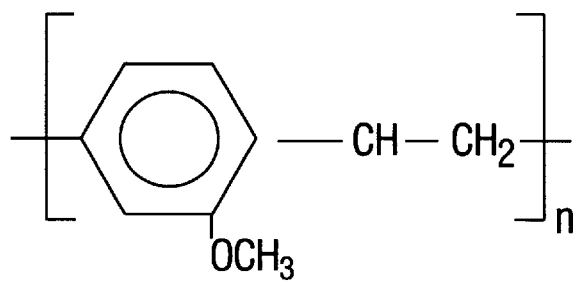
FIG. 1B. The polymer of 2,5-methoxy-p-phenylenevinylene.
Figure 2A:
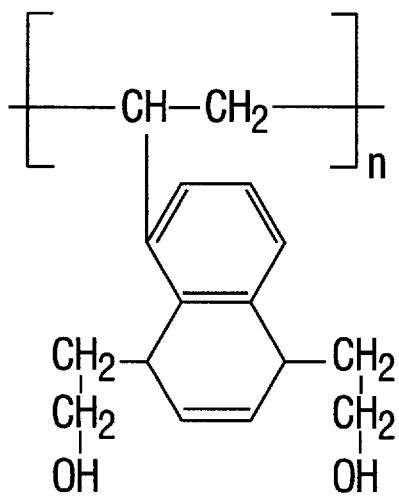
FIG. 2A. The polymer of vinyl naphthalene.
Figure 2B:
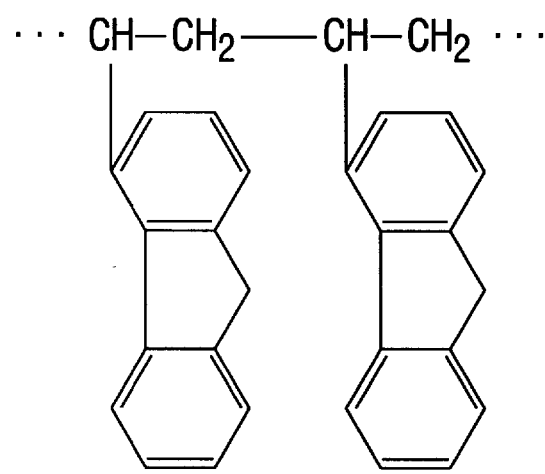
FIG. 2B. The polymer of vinyl-2-fluorene.
Figure 3A:
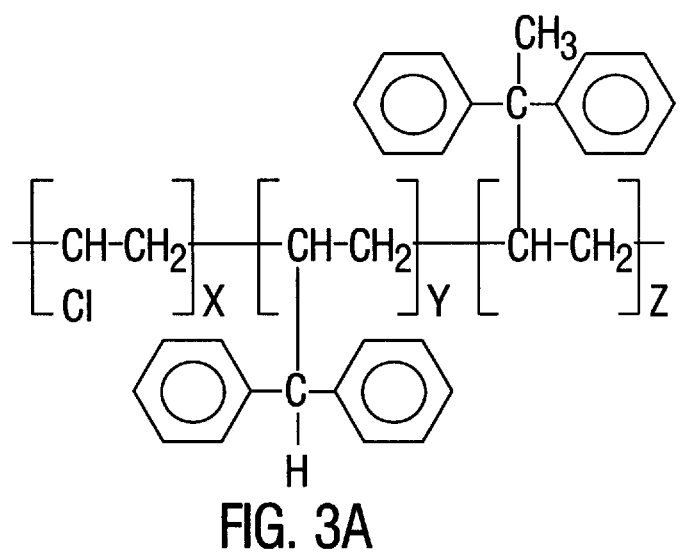
FIG. 3A. The polymer of vinyl-3-polydiphenyl-3-propene.
Figure 3B:
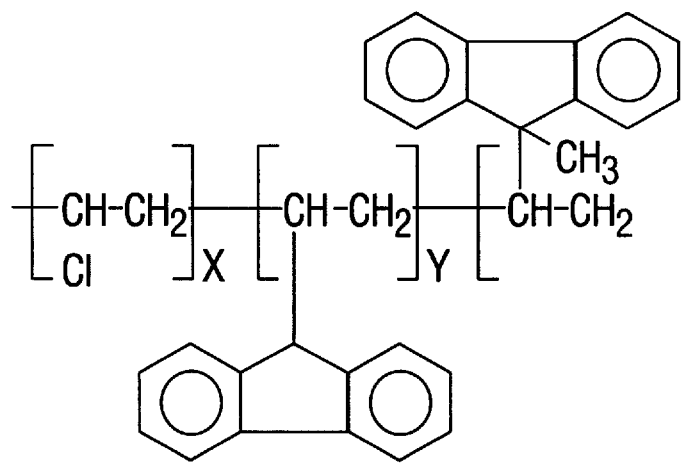
FIG. 3B. The polymer of vinyl-polyvinyl-2-fluorene.

A second composition used was a 2% chloroform solution of the monomer 2,5-methoxy-p-phenylenevinylene (FIG. 1B).

Example 3

Vinyl Monomers Activated by Trialkylbenzylstannane, Preparation of Hologram Recording Material Another type of polymerization which provides better speed and stability is that of vinylmonomers activated by trialkylbenzylstannane [3].

A basic emulsion composition was:
  Cellulose Acetate Butyrate (binder) 43
  Hexanedioldiacrylate (monomer) 26
  Eosin (spectral sensitizer) 0.09
  Trialkylbenzylstannane (activator) 9
  Diethylphthalate (plasticizer) 22
  Acetone 500

The activator trialkylbenzylstannane of formula $R_3SnCH_2A_2$ may vary in structure with R preferably being:
  a. R=Phenyl
  b. R=p-methoxyphenyl
  c. R=p-fluorophenyl
  d. R=p-chlorophenyl Example 4

Photodegradeable Materials

Photodegradable materials, such as polymethyl methacrylate (PMMA) may be used in the present invention to prepare the microhologram of the present inventors. Other photodegradable materials include the commercial products listed below:

(a) The polyhexafluoropropylene:

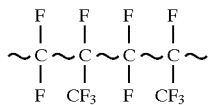

Figure 4:
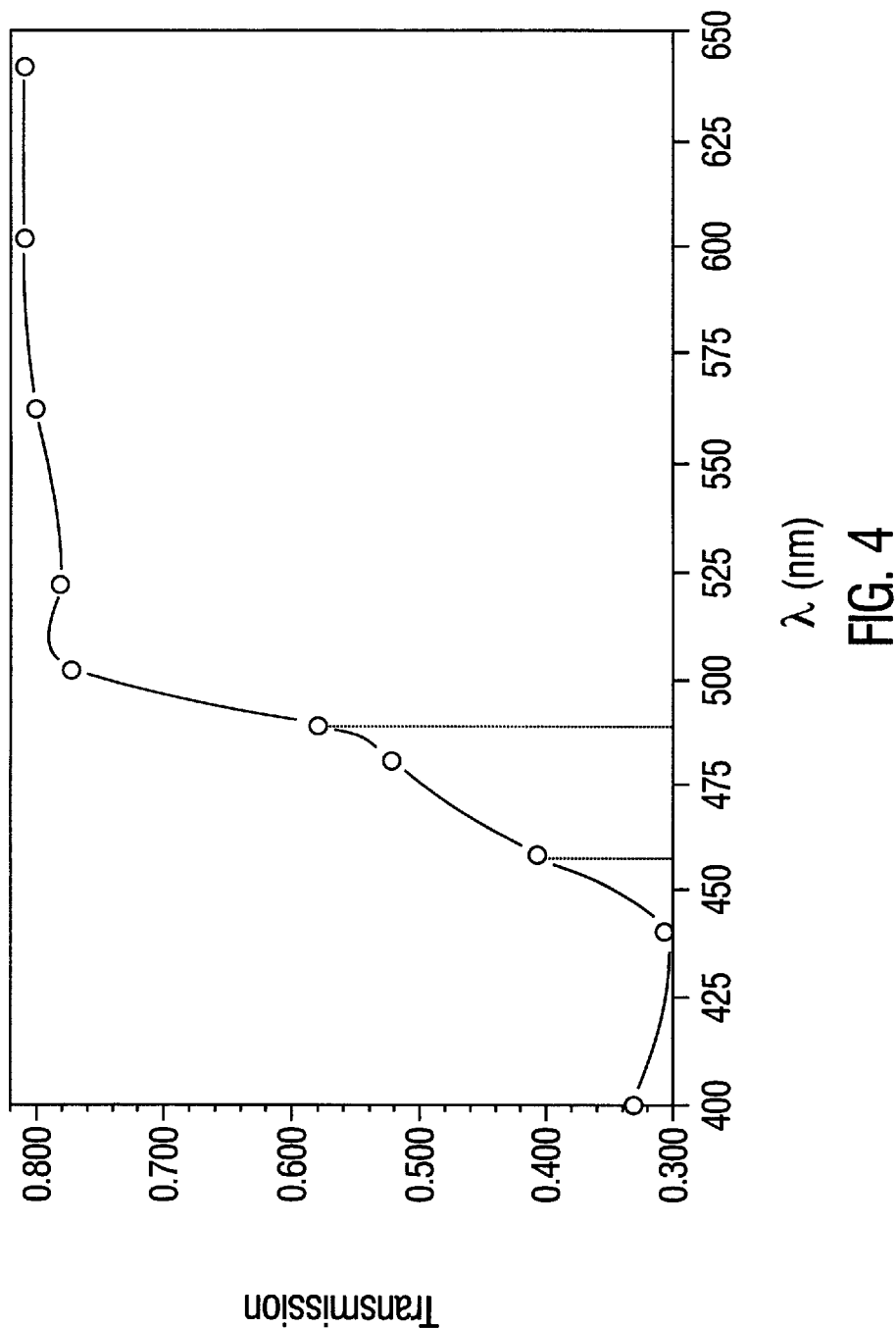
FIG. 4. Transmission curve for polymethyl methacrylate. Absorption covers of both the Ne and Argon wavelength. These observations demonstrate that an image may be recorded within a hole of the card in one wavelength and then the recording may be followed with a second wavelength. The recording of a hologram at different wavelengths in one hologram increases the secure nature of the ID card by insuring that two (or more) images are reconstructed simultaneously at different wavelengths, and played back at different locations. Whereas if the holographic spot was noticed on the card, and image reconstructed successfully, the fact that additional holographic images were recorded on the same area would be exceedingly difficult to decipher. Also, the holographic spots recorded at more than one wavelength need not be coincident on the card.

(b) The vinylidene fluoride—hexafluoropropylene copolymer:

PMMA gives $\Delta n \sim 10^{-3}$ and good resolution but required very high laser beam intensity (10 J/cm$^2$). One of the advantages was that the material sensitized with benzoquinone had an absorption spectrum covering both the Argon and the HeNe lines which made it possible to follow the recording made with one laser (Argon) with another (HeNe). FIG. 4 shows a transmission curve for PMMA.

A typical emulsion was composed of:
  PMMA 10 g (a monomer)
  Chloroform 100 cc
  Parabenzoquinone 0.5 g (sensitizer)

While the compositions and methods of this invention have been described in terms of preferred embodiments, it will be apparent to those of skill in the art that variations may be applied to the systems, compositions, methods and in the steps or in the sequence of steps of the methods described herein without departing from the concept, spirit and scope of the invention. For example, it will be apparent that certain agents which are chemically, compositionally and functionally related may be substituted for the agents described herein where the same or similar results may be achieved. All such similar substitutes and modifications apparent to those skilled in the art are considered to be within the spirit, scope and concept of the invention as defined by the appended claims.

REFERENCES

The following references, to the extent that they provide exemplary procedural or other details supplementary to those set forth herein, are specifically incorporated herein by reference.

U.S. Pat. No. 4,832,445 (1989) to Haines and Weller.
U.S. Pat. No. 4,945,215 (1990) to Fujita et al.
U.S. Pat. No. 5,066,047 (1991) to Neal et al.
U.S. Pat. No. 5,1699,707 (1992) to Bingham et al.
AU 8814140 (1988) to Tobin.
EP 486065 (1992) to Boehm et. al.
JP 4338593 (1992) to Konica Corp.
SU 647926 (1985) to Yarmosh et al.
Goutiere et al. (1964) Bull. Soc. Chim. 6:153.
Gutmann and Lyons (1967) *Organic Semiconductors,* Wiley, N.Y.
Hacking (1977) *BBC Engineering,* 105:21–39.
Halperin (1967) *Advances in Chemical Physics,* 13:123.
Robillard (1990) in *Industrial Application of Holography,* Robillard and Caulfield Ed., Oxford University Press, New York, 136.

What is claimed is:

1. An identity card comprising:
   a card; and
   one microhologram or a multiplicity of microholograms recorded on a high efficiency variable index material depicting the card wherein said microhologram or microholograms are located within micro-size holes on one surface or a multiplicity of surfaces of the card.

2. The identity card of claim 1 wherein the card is plastic, metal, paper, cardboard, laminated or a metal alloy.

3. The identity card of claim 1 wherein the variable index material is an organic semiconductor.

4. The identity card of claim 1 wherein 2,3, or 4 holographic images are comprised within the card.

5. The identity card of claim 1 wherein the microhologram has a thickness of from about 20 to about 100 microns and a diameter of from about 10 to about 100 microns.

6. The identity card of claim 1 wherein the surface of the card includes a design incorporating the microhologram.

7. The identity card of claim 1 wherein the identity card is a social security card, a drivers license, or an employee access card.

8. The identity card of claim 1 wherein the micro-size holes are about 10 microns diameter.

9. The identity card of claim 1 wherein the micro-size holes are between about 40 and about 60 microns diameter.

10. The identity card of claim 1 wherein the micro-size holes have a depth of about 500 to about 1000 microns.

11. The identity card of claim 1 wherein the high efficiency variable index material comprises an organic semiconductor.

12. The identity card of claim 11 wherein the organic semiconductor is a polyvinylcinnamate.

13. The identity card of claim 1 wherein the high efficiency variable index material comprises poly-2,5-thienylenevinylene, 2,5-methoxy-p-phenylenevinylene, a polymer of vinyl naphthalene, a polymer of vinyl-2- fluorene, a polymer of vinyl-3-polydiphenyl-3-propene or vinyl-polyvinyl-2-fluorene.

14. The identity card of claim 1 wherein the high efficiency variable index material comprises a photopolymerizable, photoisomerizable or photodegradable material.

15. The identity card of claim 14 wherein the photodegradable material is polymethyl methacrylate, vinylidene fluoride/hexafluoropropylene copolymer or polyhexafluoropropylene.

* * * * *